US010148934B2

(12) United States Patent
Lin

(10) Patent No.: US 10,148,934 B2
(45) Date of Patent: Dec. 4, 2018

(54) IMAGE PROCESS APPARATUS AND IMAGE PROCESS METHOD

(71) Applicant: eYs3D Microelectronics, Co., Taipei (TW)

(72) Inventor: Wen-Kuo Lin, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/067,189

(22) Filed: Mar. 11, 2016

(65) Prior Publication Data
US 2016/0269709 A1 Sep. 15, 2016

(30) Foreign Application Priority Data

Mar. 13, 2015 (TW) .............................. 104108148 A

(51) Int. Cl.
*G06K 9/00* (2006.01)
*H04N 13/156* (2018.01)
*H04N 13/271* (2018.01)
*G06T 11/60* (2006.01)
*H04N 13/296* (2018.01)
*H04N 13/239* (2018.01)
*H04N 13/00* (2018.01)

(52) U.S. Cl.
CPC ........... *H04N 13/156* (2018.05); *G06T 11/60* (2013.01); *H04N 13/239* (2018.05); *H04N 13/271* (2018.05); *H04N 13/296* (2018.05); *H04N 2013/0081* (2013.01); *H04N 2013/0092* (2013.01); *H04N 2013/0096* (2013.01)

(58) Field of Classification Search
CPC ............. H04N 13/004; H04N 13/0239; H04N 13/0271; H04N 13/0007; H04N 13/0051; H04N 13/0081
USPC ......................................................... 382/154
See application file for complete search history.

(56) References Cited

U.S. PATENT DOCUMENTS 7,110,184 B1 * 9/2006 Yona .................. G02B 27/0101
345/7
8,922,628 B2 * 12/2014 Bond ................... H04N 13/026
345/419

(Continued)

FOREIGN PATENT DOCUMENTS

| CN | 102695068 A | 9/2012 |
|---|---|---|
| CN | 102780855 A | 11/2012 |
| CN | 103337079 A | 10/2013 |

*Primary Examiner* — Iman K Kholdebarin
(74) *Attorney, Agent, or Firm* — Winston Hsu

(57) ABSTRACT

An image process apparatus includes an image capture device, a filter, a depth estimation unit, and a mixture unit. The image capture device captures an original image including at least one target object and generates a first depth map corresponding to the original image. The filter selects the at least one target object from the original image according to the first depth map and generates a temporary image including the at least one target object. The temporary image has a depth information of the at least one target object. The depth estimation unit generates a second depth map corresponding to an input image according to the input image. The mixture unit blends the temporary image into a predetermined field depth of the input image to generate a blending image including the input image and the at least one target object according to the depth information and the second depth map.

16 Claims, 15 Drawing Sheets

(56) References Cited

U.S. PATENT DOCUMENTS

| | | | |
|---|---|---|---|
| 8,971,611 B2* | 3/2015 | Takeshita | G06T 5/001 |
| | | | 382/154 |
| 9,241,146 B2* | 1/2016 | Neill | |
| 9,414,048 B2* | 8/2016 | Karsch | H04N 13/026 |
| 9,445,072 B2* | 9/2016 | Stefanoski | |
| 9,549,164 B2* | 1/2017 | Nagai | H04N 13/106 |
| 2014/0232820 A1 | 8/2014 | Ha | |
| 2014/0327736 A1 | 11/2014 | DeJohn | |
| 2016/0269709 A1* | 9/2016 | Lin | H04N 13/271 |

* cited by examiner

IMAGE PROCESS APPARATUS AND IMAGE PROCESS METHOD

BACKGROUND OF THE INVENTION

1. Field of the Invention

The present invention relates to an image process apparatus and an image process method, and particularly to an image process apparatus and an image process method that can blend a part of the original image into a corresponding field depth or a predetermined field depth of an input image according to depth information of the original image and the input image.

2. Description of the Prior Art

Dual-cameras module is widely used in many terminal devices, such as notebooks or smart-phones, for image processing purpose. A terminal device with a dual-cameras module can blend at least one target object captured by the dual-cameras module into an input image received by the terminal device to generate a virtual reality image including the at least one target object and the input image. However, the terminal device only covers the at least one target object captured by the dual-cameras module on the input image. That is to say, when the terminal device blends the at least one target object captured by the dual-cameras module into the input image, the terminal device does not blend the at least one target object captured by the dual-cameras module into a corresponding field depth within the input image according to depth information of the at least one target object captured by the dual-cameras module. Therefore, how to really blend the at least one target object captured by the dual-cameras module into the corresponding field depth within the input image is an attractive topic.

SUMMARY OF THE INVENTION

An embodiment of the present invention provides an image process apparatus. The image process apparatus includes an image capture device, a filter, a depth estimation unit, and a mixture unit. The image capture device is used for capturing an original image comprising at least one target object and generating a first depth map corresponding to the original image. The filter is used for selecting the at least one target object from the original image according to the first depth map, and generating a temporary image comprising the at least one target object, wherein the temporary image has a depth information of the at least one target object. The depth estimation unit is used for generating a second depth map corresponding to an input image according to the input image. The mixture unit is used for blending the temporary image into a predetermined field depth of the input image to generate a blending image comprising the input image and the at least one target object according to the depth information of the at least one target object and the second depth map.

Another embodiment of the present invention provides an image process apparatus. The image process apparatus includes an image capture device, a filter, a depth estimation unit, an image intensifier, and a mixture unit. The image capture device is used for capturing an original image comprising at least one target object and generating a first depth map corresponding to the original image. The filter is used for selecting the at least one target object from the original image according to the first depth map, and generating a temporary image comprising the at least one target object, wherein the temporary image has a depth information of the at least one target object. The depth estimation unit is used for generating a second depth map corresponding to an input image according to the input image. The image intensifier is used for comparing the at least one target object within the temporary image with the at least one target object within the original image to intensify the at least one target object within the temporary image, and outputting an intensified temporary image. The mixture unit is used for blending the intensified temporary image into a predetermined field depth of the input image to generate a blending image comprising the input image and the at least one target object within the intensified temporary image according to the depth information of the at least one target object and the second depth map.

Another embodiment of the present invention provides an image process method, wherein an image process apparatus applied to the image process method comprises an input interface, an image capture device, a filter, a depth estimation unit, a mixture unit, and an output interface. The image process method includes the image capture device capturing an original image comprising at least one target object and generating a first depth map corresponding to the original image; the filter selecting the at least one target object from the original image according to the first depth map, and generating a temporary image comprising the at least one target object, wherein the temporary image has a depth information of the at least one target object; the depth estimation unit generating a second depth map corresponding to an input image according to the input image; and the mixture unit blending the temporary image into a predetermined field depth of the input image to generate a blending image comprising the input image and the at least one target object according to the depth information of the at least one target object and the second depth map.

The present invention provides an image process apparatus and an image process method. The image process apparatus and the image process method utilize an image capture device of the image process apparatus to capture an original image including at least one target object and generate a first depth map corresponding to the original image, utilize a filter of the image process apparatus to generate a temporary image including the at least one target object, utilize a depth estimation unit of the image process apparatus to generate a second depth map corresponding to an input image according to the input image, and utilize a mixture unit of the image process apparatus to generate a blending image including the input image and the at least one target object according to a Z-test method, a depth information of the at least one target object, and the second depth map. Therefore, compared to the prior art, because the present invention can blend the at least one target object into a corresponding field depth or a predetermined field depth of the input image to generate the blending image including the input image and the at least one target object, the present invention can enlarge an application field of the image process apparatus, and further increase life fun of a user of the image process apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
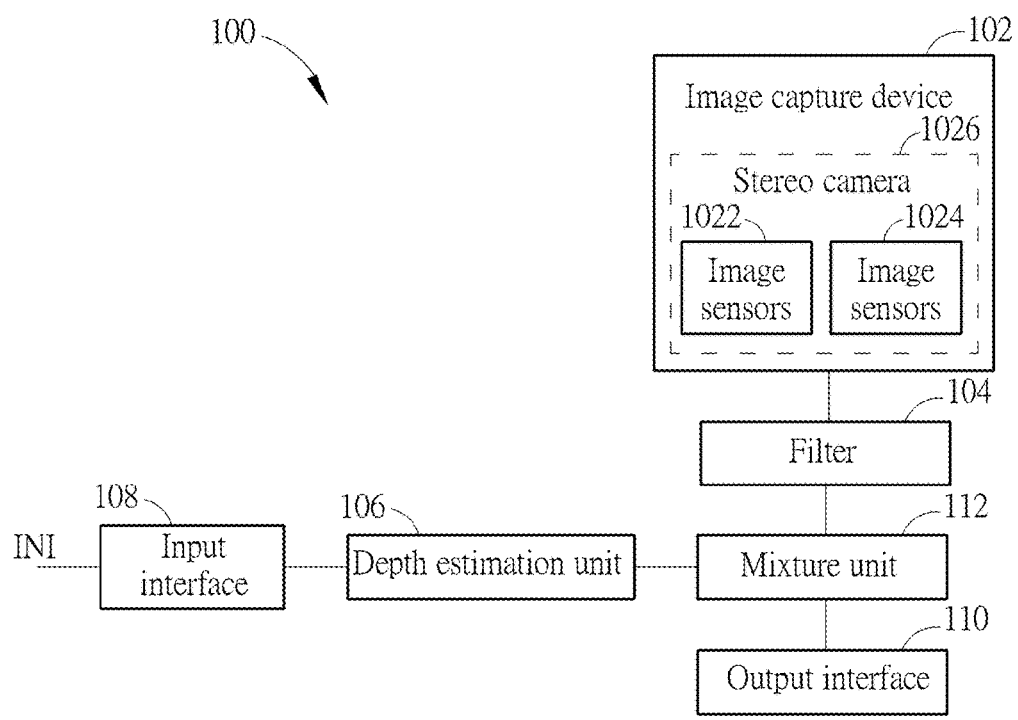
FIG. 1 is a diagram illustrating an image process apparatus according to a first embodiment.
Figure 2:
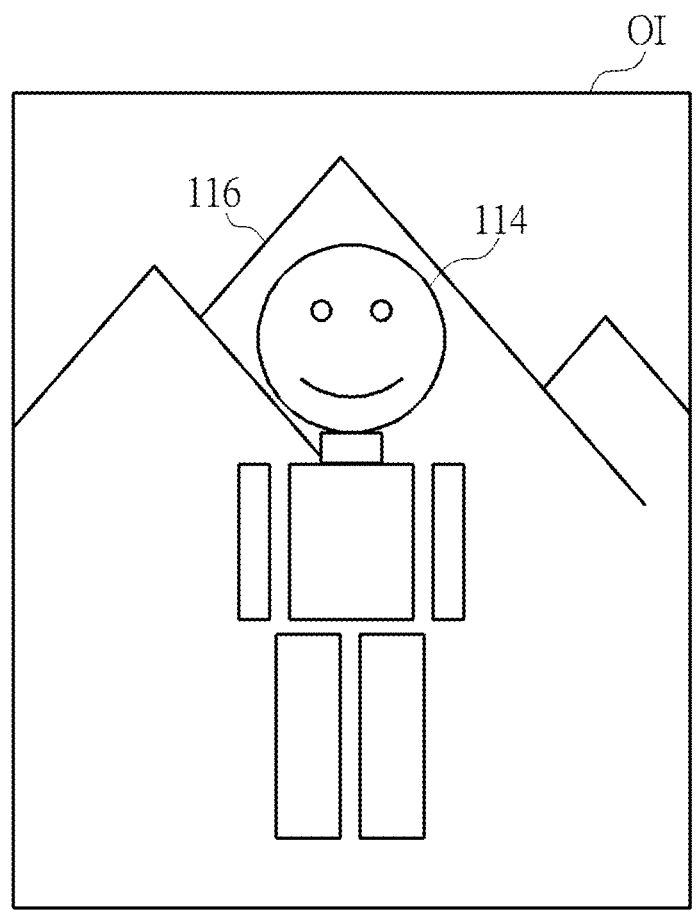
FIG. 2 is a diagram illustrating an original image.
Figure 3:
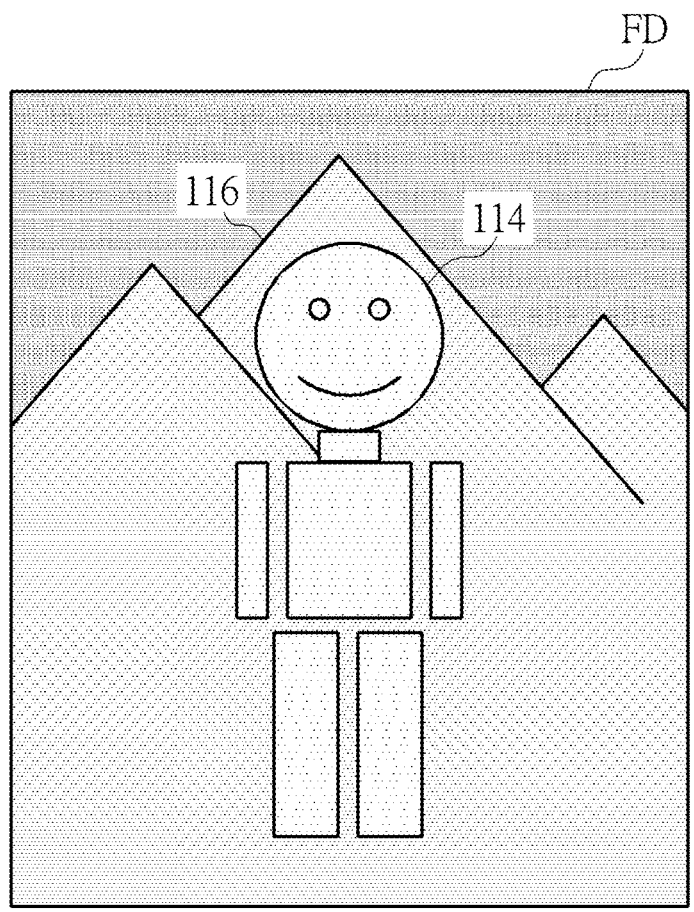
FIG. 3 is a diagram illustrating a first depth map.

Please refer to FIG. 1. FIG. 1 is a diagram illustrating an image process apparatus 100 according to a first embodiment. As shown in FIG. 1, the image process apparatus 100 includes an image capture device 102, a filter 104, a depth estimation unit 106, an input interface 108, an output interface 110, and a mixture unit 112. The image capture device 102 is used for capturing an original image OI (as shown in FIG. 2) including a target object 114 and generating a first depth map FD (as shown in FIG. 3) corresponding to the original image OI, wherein mountains 116 and the target object 114 within the original image OI have different depth information, respectively. As shown in FIG. 1, the image capture device 102 includes a stereo camera 1026 with two image sensors 1022, 1024, wherein the two image sensors 1022, 1024 of the stereo camera 1026 are used for capturing a first image and a second image corresponding to the original image OI, respectively. But, the present invention is not limited to the stereo camera 1026 including the two image sensors 1022, 1024, that is, the stereo camera 1026 can include more than two image sensors. The image capture device 102 generates the first depth map FD according to the first image and the second image generated by the stereo camera 1026, wherein for generating the first depth map FD, the image capture device 102 can insert a synchronization signal into each scan line of each frame of the first image and the second image. For example, the first image includes a first frame and the second image includes a second frame, and the image capture device 102 can insert the synchronization signal into each scan line of the first frame and the second frame. In one embodiment of the present invention, each frame of the first frame and the second frame includes 720 scan lines, wherein a first scan line of the first frame corresponds to a first scan line of the second frame, and the image capture device 102 can insert a same synchronization signal into the first scan line of the first frame and the first scan line of the second frame. Thus, the image capture device 102 can calculate depth map information corresponding to the first scan line of the first frame and the first scan line of the second frame according to the first scan line of the first frame and the first scan line of the second frame. In addition, a frequency of the synchronization signal is varied according to a number of scan lines of the first frame and the second frame (or a resolution of the first frame and the second frame). In addition, in another embodiment of the present invention, the original image OI can include a video data stream composed of a group of original frames, and the first depth map FD includes a plurality of depth map information corresponding to the group of original frames. For example, the group of original frames include a first group of frames corresponding to the first image and a second group of frames corresponding to the second image, and the first depth map FD includes the plurality of depth map information, wherein the plurality of depth map information are generated by the image capture device 102 according to the first group of frames and the second group of frames, and the plurality of depth map information correspond to the group of original frames. In addition, the present invention is not limited to the original image OI only including the target object 114, that is, the original image OI can include more than one target object.

Figure 4:
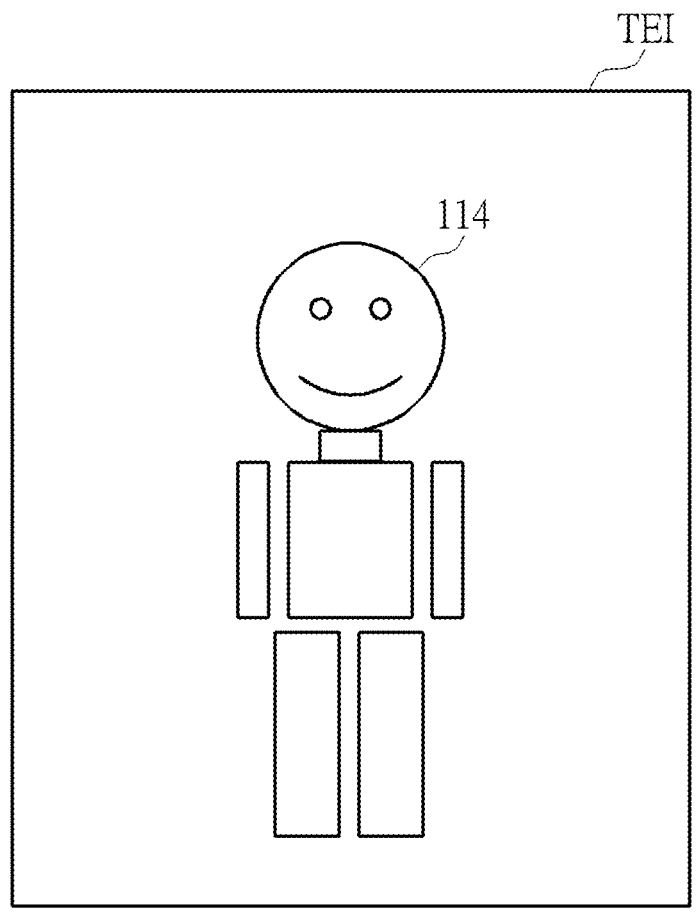
FIG. 4 is a diagram illustrating a temporary image.

As shown in FIG. 1, the filter 104 is coupled to the image capture device 102 is used for selecting the target object 114 from the original image OI and generating a temporary image TEI (as shown in FIG. 4) including the target object 114 according to the first depth map FD (including a depth information of the target object 114) corresponding to the original image OI, wherein the temporary image TEI has the depth information of the target object 114. In another embodiment of the present invention, the filter 104 is used for removing other objects within the original image OI different from the target object 114 to generate the temporary image TEI including the target object 114.

Figure 5:
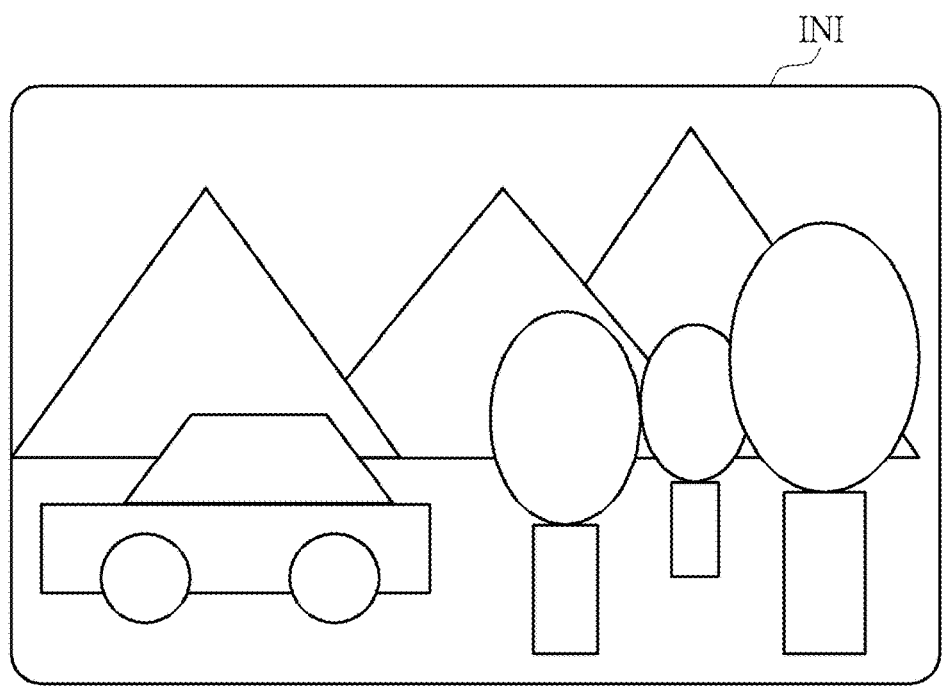
FIG. 5 is a diagram illustrating a two-dimensional video frame.
Figure 6:
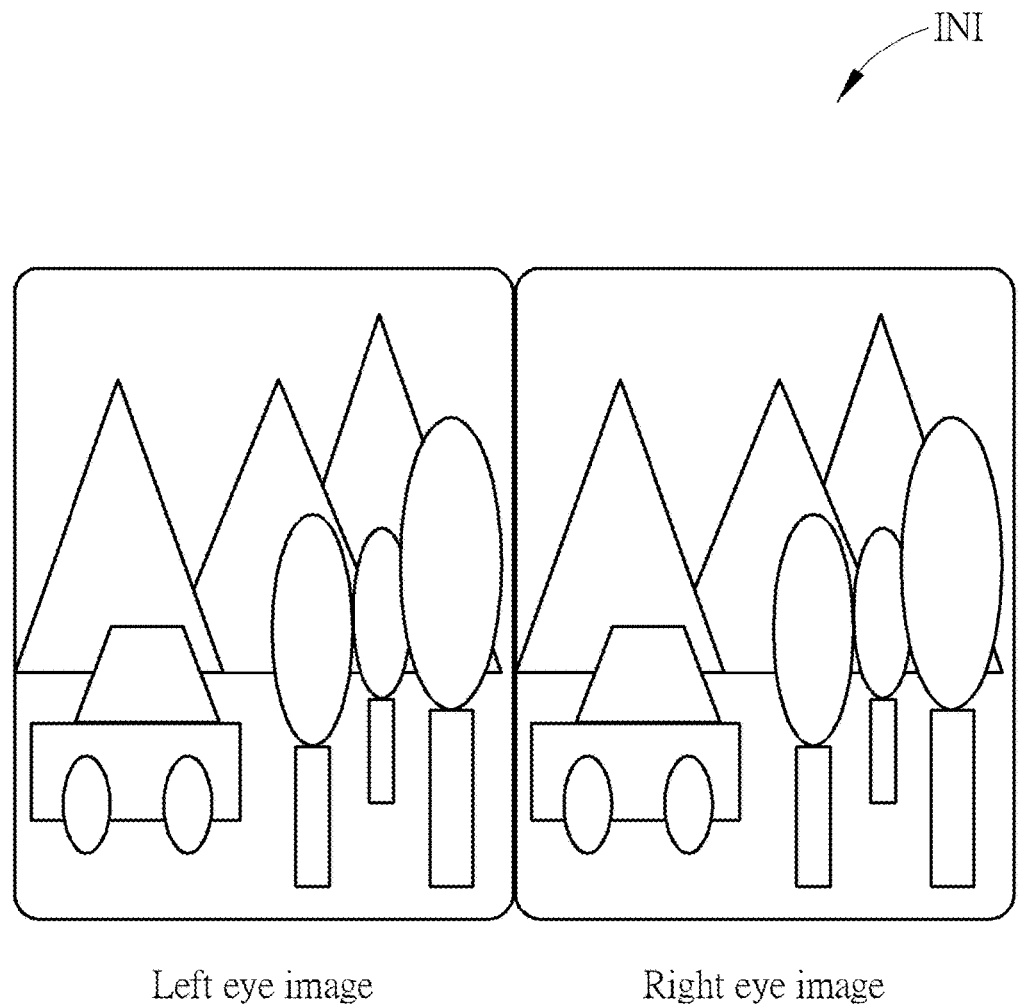
FIG. 6 is a diagram illustrating a video frame with a side-by-side three-dimensional image format.
Figure 7:
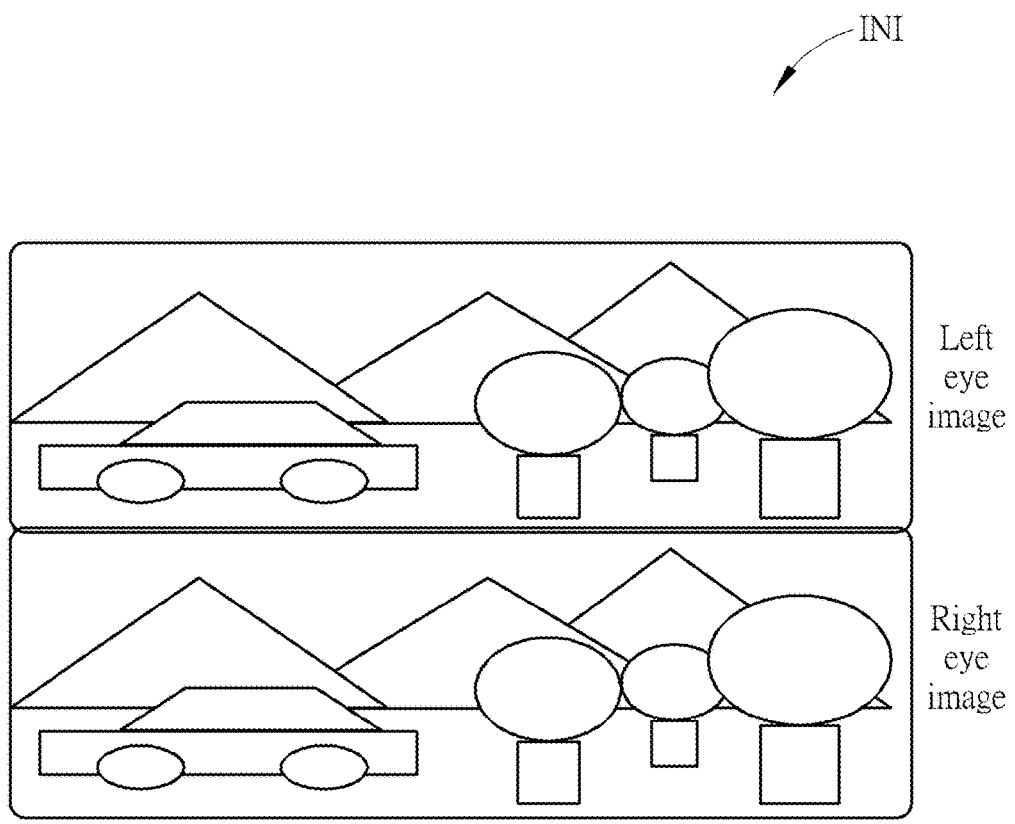
FIG. 7 is a diagram illustrating a video frame with a top-and-bottom three-dimensional image format.
Figure 8:
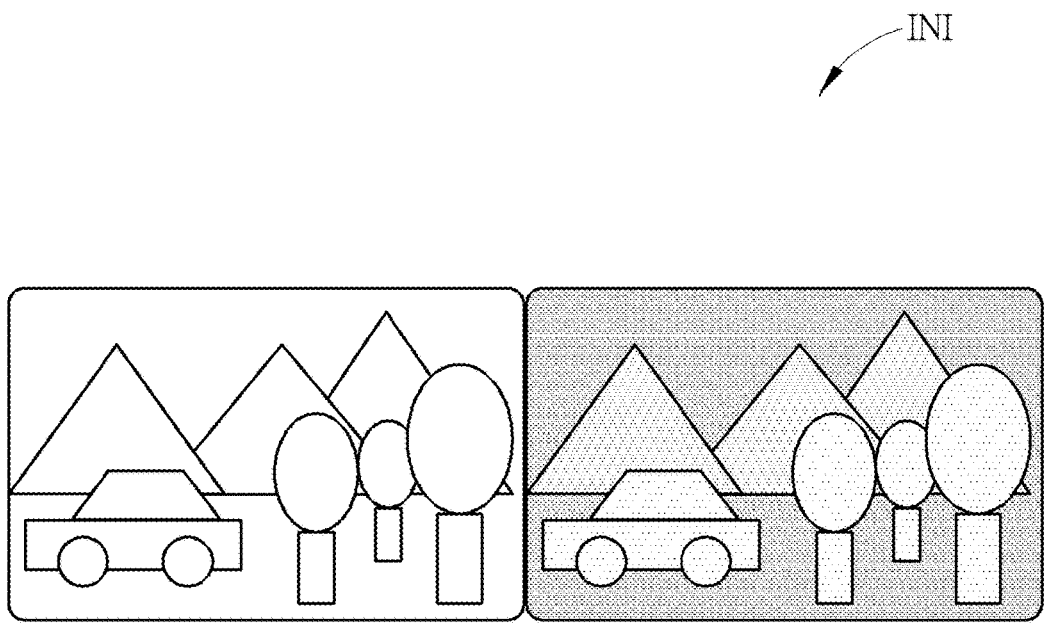
FIG. 8 is a diagram illustrating a video frame with a two-dimensional image plus depth information three-dimensional image format.

As shown in FIG. 1, the input interface 108 is used for receiving an input image INI, wherein the input interface 108 can be a High-Definition Multimedia Interface (HDMI), a Universal Serial Bus (USB) interface, a thunderbolt interface, a wireless communication interface, or other interfaces for receiving the input image INI. In addition, the input image INI can be a two-dimensional video frame (as shown in FIG. 5), a video frame with a side-by-side three-dimensional image format (as shown in FIG. 6), a video frame with a top-and-bottom three-dimensional image format (as shown in FIG. 7), or a video frame with a two-dimensional image plus depth information three-dimensional image format (as shown in FIG. 8), wherein when the input image INI is the video frame with the two-dimensional image plus depth information three-dimensional image format, because the input image INI has extracted corresponding depth information, the depth estimation unit 106 is unnecessary. In addition, in another embodiment of the present invention, the input image INI can be a video data stream or a movie with a group of frames.

Figure 9:
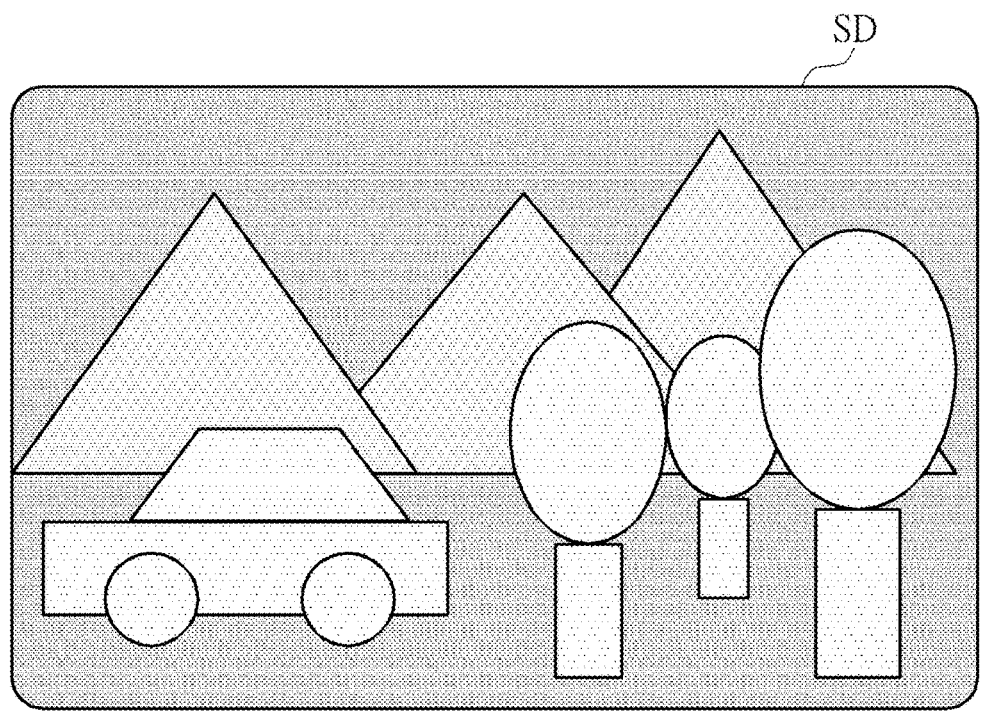
FIG. 9 is a diagram illustrating a second depth map.
Figure 10:
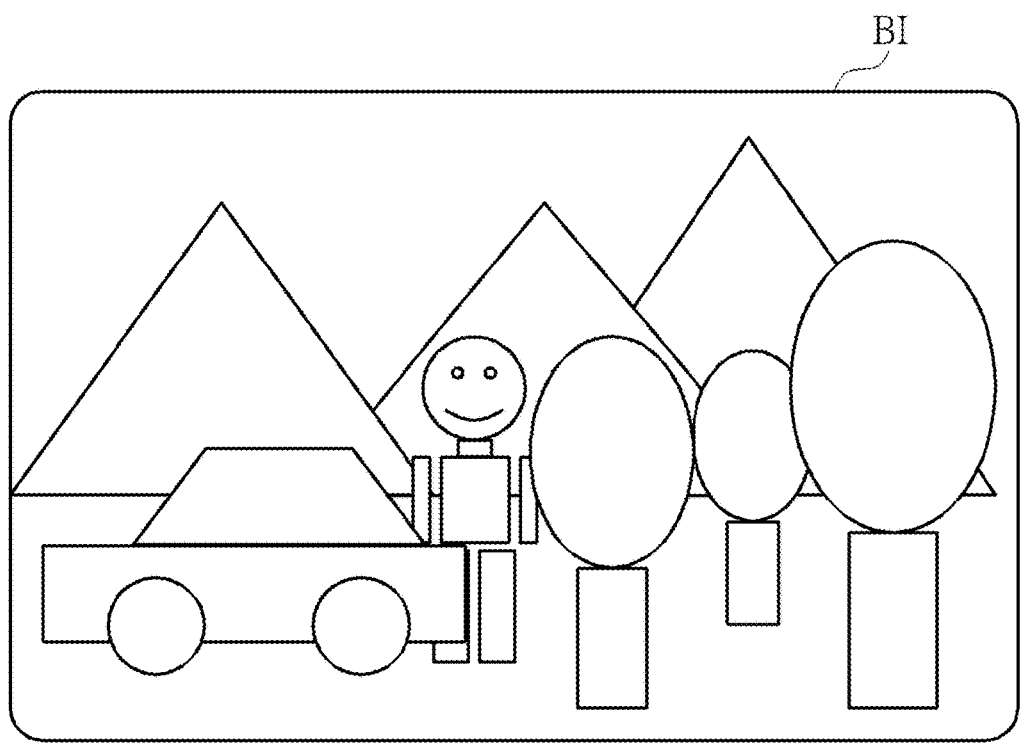
FIG. 10 is a diagram illustrating a blending image.

As shown in FIG. 1, the depth estimation unit 106 is coupled to the input interface 108 for generating a second depth map SD corresponding to the input image INI (as shown in FIG. 9) according to the input image INI. The mixture unit 112 is coupled to the depth estimation unit 106 and the filter 104 for blending the temporary image TEI into a predetermined field depth of the input image INI to generate a blending image BI including the input image INI and the target object 114 (as shown in FIG. 10) according to the depth information of the target object 114 and the second depth map SD, rather than only fixedly blending the temporary image TEI into a smallest field depth or a greatest field depth of the input image INI like the prior art. The predetermined field depth can be determined according to the first depth map FD and the second depth map SD, or a value between the smallest field depth and the greatest field depth of the second depth map SD. In one embodiment of the present invention, the mixture unit 112 coupled to the depth estimation unit 106 and the filter 104 blends the temporary image TEI into the input image INI to generate the blending image BI including the input image INI and the target object 114 (as shown in FIG. 10) according to a Z-test method, the depth information of the target object 114, and the second depth map SD. The mixture unit 112 can blend the target object 114 into a corresponding field depth or the predetermined field depth of the input image INI to generate the blending image BI according to the Z-test method, the depth information of the target object 114, and the second depth map SD, rather than only blending the target object 114 into the smallest field depth or the greatest field depth of the input image INI.

As shown in FIG. 1, the output interface 110 is used for receiving the blending image BI from the mixture unit 112, and outputting the blending image BI to an external display, wherein the output interface 110 can be a HDMI, a USB interface, a thunderbolt interface, a wireless communication interface, or other interfaces for outputting the blending image BI to the external display.

Figure 11:
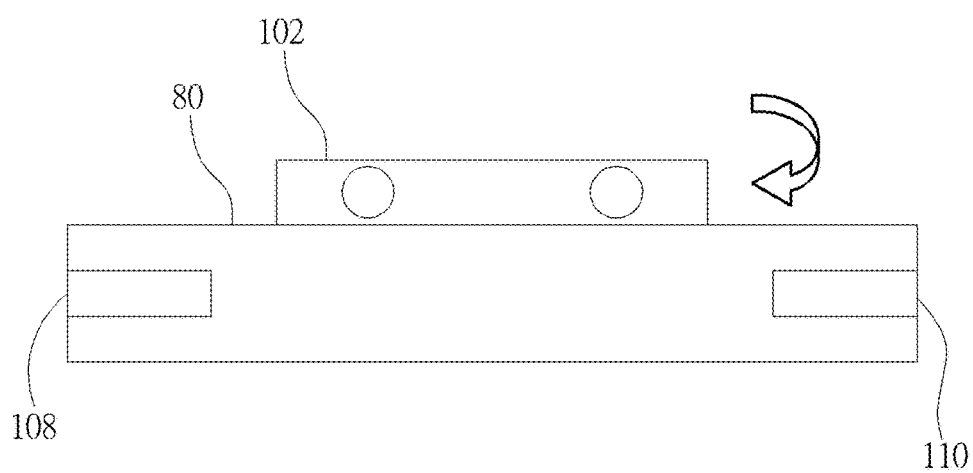
FIG. 11 is a diagram illustrating a profile of the image process apparatus including a box.
Figure 12:
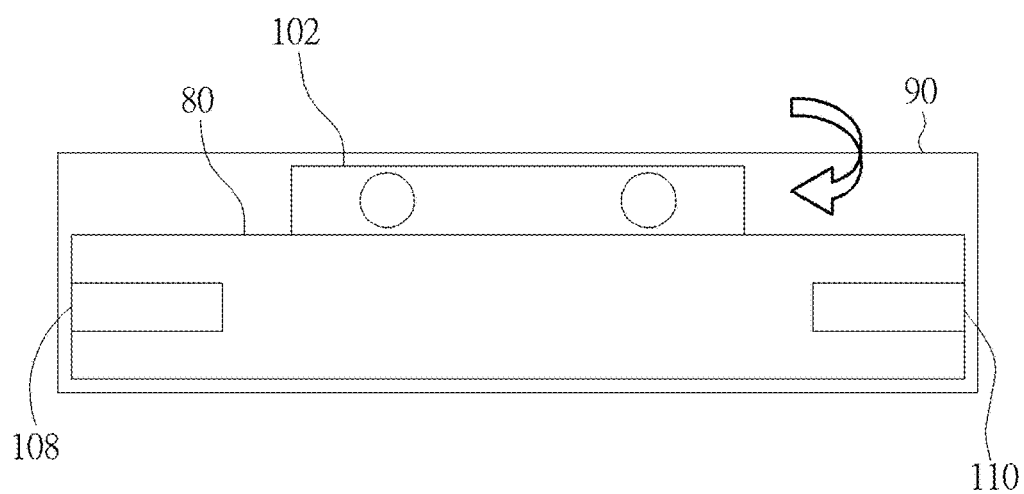
FIG. 12 is a diagram illustrating the image process apparatus further including a case.

Further, please refer to FIG. 11. FIG. 11 is a diagram illustrating a profile of the image process apparatus 100 including a box 80. As shown in FIG. 11, the input interface 108 and the output interface 110 are installed at two side of the box 80, and the input interface 108 receives the input image INI and the output interface 110 outputs the blending image BI. The image capture device 102 is installed above the box 80, and a view angle of the image capture device 102 can be adjusted automatically or manually to capture the original image OI including the target object 114. In addition, the image process apparatus 100 can further include a case 90 (as shown in FIG. 12), the case 90 is used for covering the image capture device 102 and the box 80, that is, the case 90 can cover the image capture device 102, the filter 104, the mixture unit 112, the input interface 108, the depth estimation unit 106, and the output interface 110 of the image process apparatus 100 (as shown in FIG. 1).

Figure 13:
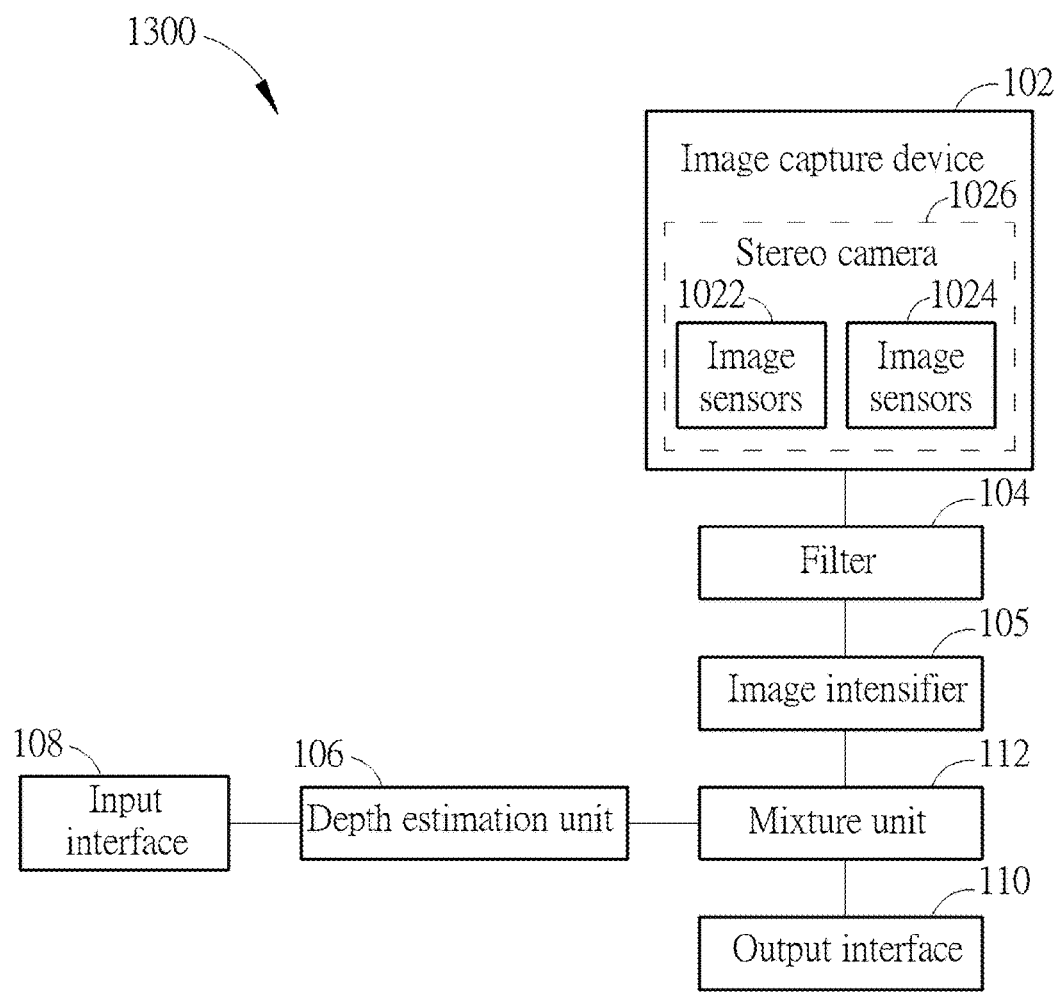
FIG. 13 is a diagram illustrating an image process apparatus according to a second embodiment.

Please refer to FIG. 13. FIG. 13 is a diagram illustrating an image process apparatus 1300 according to a second embodiment. As shown in FIG. 13, a difference between the image process apparatus 1300 and the image process apparatus 100 is that the image process apparatus 1300 further includes an image intensifier 105. As shown in FIG. 13, the image intensifier 105 is coupled between the filter 104 and the mixture unit 112, and the image intensifier 105 is used for comparing the target object 114 within the temporary image TEI with the target object 114 within the original image OI to intensify the target object 114 within the temporary image TEI, and outputting an intensified temporary image to the mixture unit 112, wherein the target object 114 within the intensified temporary image is clearer than the target object 114 within the temporary image TEI. After the mixture unit 112 receives the intensified temporary image and the input image INI, the mixture unit 112 can blend the intensified temporary image into the input image INI to generate a blending image including the input image INI and the target object 114 within the intensified temporary image. In addition, the image intensifier 105 includes a buffer, wherein the buffer is used for storing the original image OI and the temporary image TEI. In addition, subsequent operational principles of the image process apparatus 1300 are the same as those of the image process apparatus 100, so further description thereof is omitted for simplicity.

Figure 14:
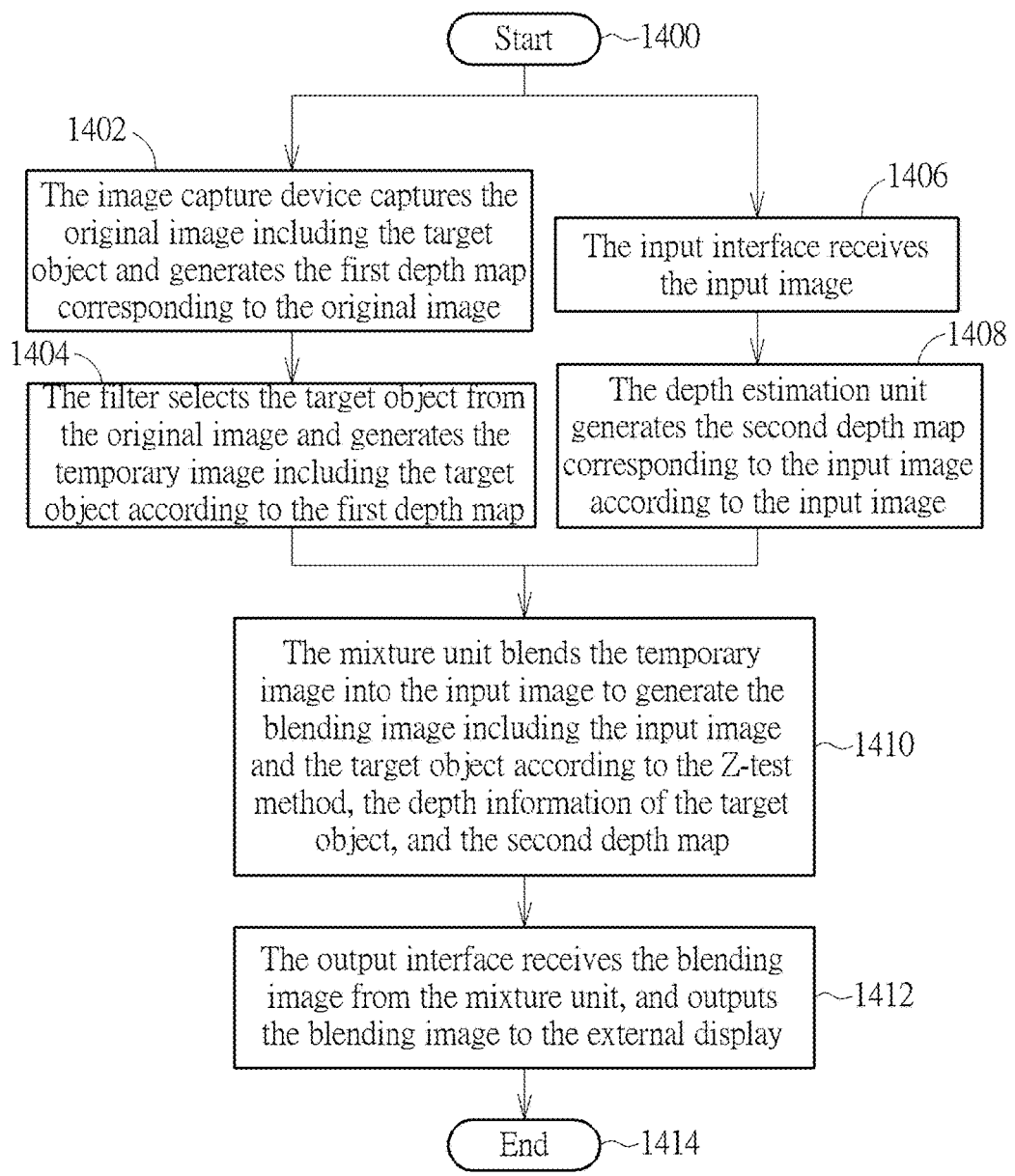
FIG. 14 is a flowchart illustrating an image process method according to a third embodiment.

Please refer to FIGS. 1-10 and FIG. 14. FIG. 14 is a flowchart illustrating an image process method according to a third embodiment. The image process method in FIG. 14 is illustrated using the image process apparatus 100 in FIG. 1. Detailed steps are as follows:

Step 1400: Start.
Step 1402: The image capture device 102 captures the original image OI including the target object 114 and generates the first depth map FD corresponding to the original image OI.
Step 1404: The filter 104 selects the target object 114 from the original image OI and generates the temporary image TEI including the target object 114 according to the first depth map FD, go to Step 1410.
Step 1406: The input interface 108 receives the input image INI.
Step 1408: The depth estimation unit 106 generates the second depth map SD corresponding to the input image INI according to the input image INI.
Step 1410: The mixture unit 112 blends the temporary image TEI into the input image INI to generate the blending image BI including the input image INI and the target object 114 according to the Z-test method, the depth information of the target object 114, and the second depth map SD.
Step 1412: The output interface 110 receives the blending image BI from the mixture unit 112, and outputs the blending image BI to the external display.
Step 1414: End.

In Step 1402, as shown in FIG. 2, the mountains 116 and the target object 114 within the original image OI captured by the image capture device 102 have different depth information, respectively. In addition, the present invention is not limited to the original image OI only including the target object 114, that is, the original image OI can include more than one target object.

In Step 1404, as shown in FIG. 4, the filter 104 can select the target object 114 from the original image OI and generate the temporary image TEI including the target object 114 according to the first depth map FD (including the depth information of the target object 114) corresponding to the original image OI, wherein the temporary image TEI has the depth information of the target object 114. In addition, in another embodiment of the present invention, the filter 104 is used for removing the other objects within the original image OI different from the target object 114 to generate the temporary image TEI including the target object 114.

In Step 1406, the input image INI can be the two-dimensional video frame (as shown in FIG. 5), the video frame with the side-by-side three-dimensional image format (as shown in FIG. 6), the video frame with the top-and-bottom three-dimensional image format (as shown in FIG. 7), or the video frame with the two-dimensional image plus depth information three-dimensional image format (as shown in FIG. 8), wherein when the input image INI is the video frame with the two-dimensional image plus depth information three-dimensional image format, because the input image INI has extracted corresponding depth information, the depth estimation unit 106 is unnecessary. In addition, in another embodiment of the present invention, the input image INI can be a video data stream or a movie with a group of frames.

In Step 1408, the depth estimation unit 106 can generate the second depth map SD corresponding to the input image INI (as shown in FIG. 9) according to the input image INI. In Step 1410, after the depth estimation unit 106 generates the second depth map SD and the filter 104 generates the temporary image TEI including the target object 114, the mixture unit 112 can blend the temporary image TEI into the input image INI to generate the blending image BI including the input image INI and the target object 114 (as shown in FIG. 10) according to the Z-test method, the depth information of the target object 114, and the second depth map SD. Because the mixture unit 112 generates the blending image BI according to the Z-test method, the depth information of the target object 114, and the second depth map SD, the mixture unit 112 can blend the target object 114 into a corresponding field depth or the predetermined field depth of the input image INI.

Figure 15:
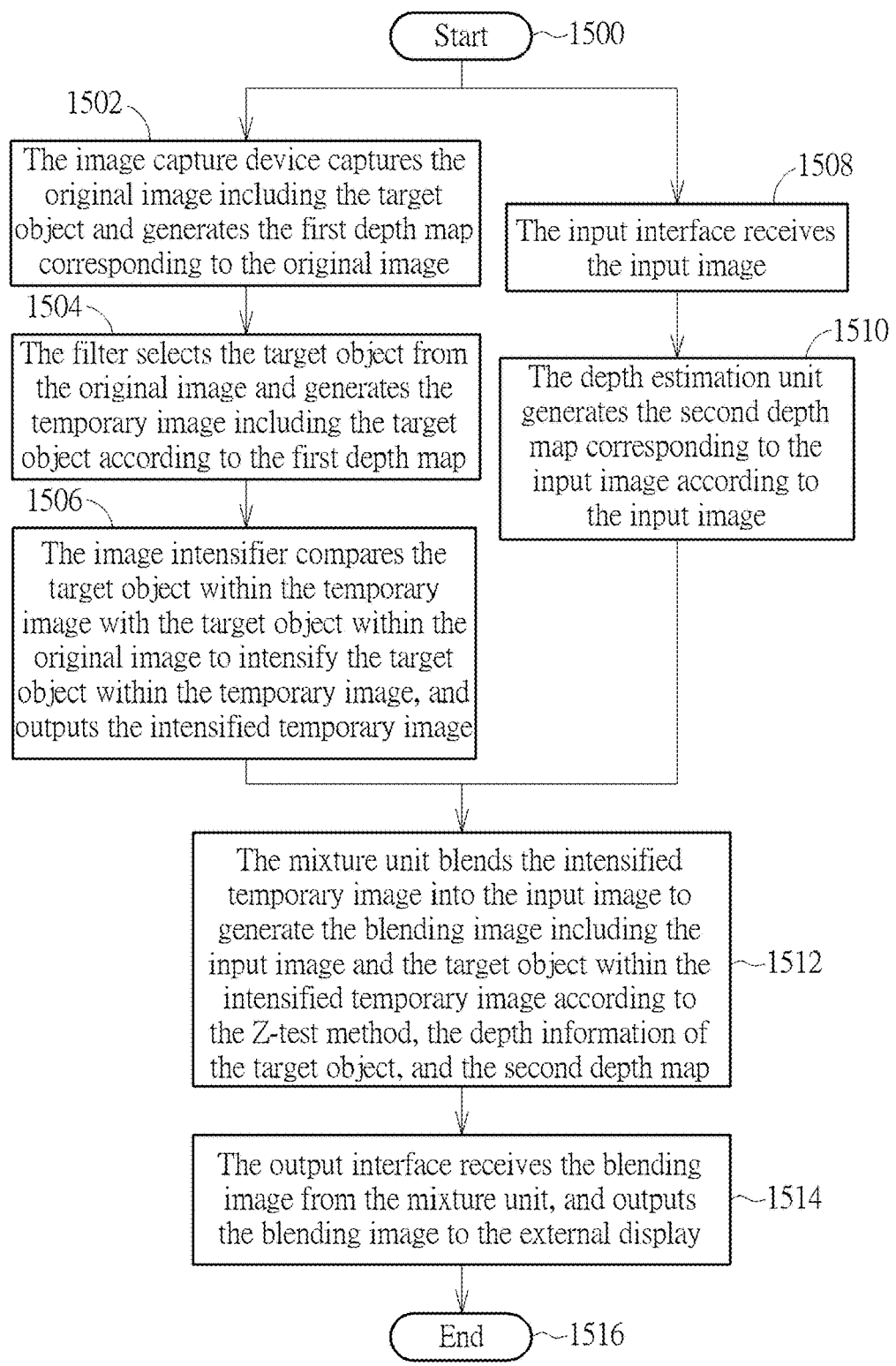
FIG. 15 is a flowchart illustrating an image process method according to a fourth embodiment.

Please refer to FIG. 13 and FIG. 15. FIG. 15 is a flowchart illustrating an image process method according to a fourth embodiment. The image process method in FIG. 15 is illustrated using the image process apparatus 1300 in FIG. 13. Detailed steps are as follows:

Step 1500: Start.

Step 1502: The image capture device 102 captures the original image OI including the target object 114 and generates the first depth map FD corresponding to the original image OI.

Step 1504: The filter 104 selects the target object 114 from the original image OI and generates the temporary image TEI including the target object 114 according to the first depth map FD.

Step 1506: The image intensifier 105 compares the target object 114 within the temporary image TEI with the target object 114 within the original image OI to intensify the target object 114 within the temporary image TEI, and outputs the intensified temporary image, go to Step 1512.

Step 1508: The input interface 108 receives the input image INI.

Step 1510: The depth estimation unit 106 generates the second depth map SD corresponding to the input image INI according to the input image INI.

Step 1512: The mixture unit 112 blends the intensified temporary image into the input image INI to generate the blending image including the input image INI and the target object 114 within the intensified temporary image according to the Z-test method, the depth information of the target object 114, and the second depth map SD.

Step 1514: The output interface 110 receives the blending image from the mixture unit 112, and outputs the blending image to the external display.

Step 1516: End.

A difference between the embodiment in FIG. 15 and the embodiment in FIG. 14 is that in Step 1506, the image intensifier 105 can compare the target object 114 within the temporary image TEI with the target object 114 within the original image OI to intensify the target object 114 within the temporary image TEI, and output the intensified temporary image to the mixture unit 112, wherein the target object 114 within the intensified temporary image is clearer than the target object 114 within the temporary image TEI; and in Step 1512, after the mixture unit 112 receives the intensified temporary image and the input image INI, the mixture unit 112 can blend the intensified temporary image into the input image INI to generate the blending image including the input image INI and the target object 114 within the intensified temporary image. In addition, subsequent operational principles of the embodiment in FIG. 15 are the same as those of the embodiment in FIG. 14, so further description thereof is omitted for simplicity.

To sum up, the image process apparatus and the image process method utilize the image capture device to capture an original image including at least one target object and generate a first depth map corresponding to the original image, utilize the filter to generate a temporary image including the at least one target object, utilize the depth estimation unit to generate a second depth map corresponding to an input image according to the input image, and utilize the mixture unit to generate a blending image including the input image and the at least one target object according to the Z-test method, a depth information of the at least one target object, and the second depth map. Therefore, compared to the prior art, because the present invention can blend the at least one target object into a corresponding field depth or a predetermined field depth of the input image to generate the blending image including the input image and the at least one target object, the present invention can enlarge an application field of the image process apparatus, and further increase life fun of a user of the image process apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image process apparatus, comprising:
   an image capture device capturing an original image comprising at least one target object and generating a first depth map corresponding to the original image;
   a filter selecting the at least one target object from the original image according to the first depth map, and generating a temporary image comprising the at least one target object, wherein the temporary image has a depth information of the at least one target object;
   a depth estimation circuit generating a second depth map corresponding to an input image according to the input image; and
   a mixture circuit blending the temporary image into a predetermined field depth of the input image to generate a blending image comprising the input image and the at least one target object according to the depth information of the at least one target object and the second depth map, and a depth test method.

2. The image process apparatus of claim 1, further comprising:
   an input interface receiving the input image.

3. The image process apparatus of claim 2, wherein the input interface is a High-Definition Multimedia Interface (HDMI), a Universal Serial Bus (USB) interface, a thunderbolt interface, or a wireless communication interface.

4. The image process apparatus of claim 1, further comprising:
   an output interface receiving the blending image from the mixture circuit, and
   outputting the blending image to an external display.

5. The image process apparatus of claim 4, wherein the output interface is a HDMI, a USB interface, a thunderbolt interface, or a wireless communication interface.

6. The image process apparatus of claim 1, wherein the image capture device comprises a stereo camera with two image sensors, and the two image sensors generate a first image and a second image corresponding to the original image, respectively.

7. The image process apparatus of claim 6, wherein the image capture device generates the first depth map corresponding to the original image according to the first image and the second image generated by the stereo camera.

8. The image process apparatus of claim 7, wherein the first image comprises a first frame and the second image comprises a second frame, and the image capture device inserts a synchronization signal into the first frame and the second frame.

9. The image process apparatus of claim 8, wherein a frequency of the synchronization signal is varied with according to a number of scan lines of the first frame and the second frame.

10. The image process apparatus of claim 7, wherein the original image comprises a group of original frames, the group of original frames comprise a first group of frames corresponding to the first image and a second group of frames corresponding to the second image, wherein the first depth map comprises a plurality of depth map information, and the plurality of depth map information are generated by the image capture device according to the first group of frames and the second group of frames.

11. The image process apparatus of claim 10, wherein the plurality of depth map information correspond to the group of original frames.

12. An image process apparatus, comprising:
 an image capture device capturing an original image comprising at least one target object and generating a first depth map corresponding to the original image;
 a filter selecting the at least one target object from the original image according to the first depth map, and generating a temporary image comprising the at least one target object, wherein the temporary image has a depth information of the at least one target object;
 a depth estimation circuit generating a second depth map corresponding to an input image according to the input image;
 an image intensifier comparing the at least one target object within the temporary image with the at least one target object within the original image to intensify the at least one target object within the temporary image, and outputting an intensified temporary image; and
 a mixture circuit blending the intensified temporary image into a predetermined field depth of the input image to generate a blending image comprising the input image and the at least one target object within the intensified temporary image according to the depth information of the at least one target object and the second depth map.

13. The image process apparatus of claim 12, wherein the image intensifier comprises a buffer, and the buffer stores the original image and the temporary image.

14. An image process method, wherein an image process apparatus applied to the image process method comprises an input interface, an image capture device, a filter, a depth estimation circuit, a mixture circuit, and an output interface, the image process method comprising:
 the image capture device capturing an original image comprising at least one target object and generating a first depth map corresponding to the original image;
 the filter selecting the at least one target object from the original image according to the first depth map, and generating a temporary image comprising the at least one target object, wherein the temporary image has a depth information of the at least one target object;
 the depth estimation circuit generating a second depth map corresponding to an input image according to the input image; and
 the mixture circuit blending the temporary image into a predetermined field depth of the input image to generate a blending image comprising the input image and the at least one target object according to the depth information of the at least one target object and the second depth map, and a depth test method.

15. The image process method of claim 14, further comprising:
 the input interface receiving the input image.

16. The image process method of claim 14, further comprising:
 the output interface receiving the blending image from the mixture circuit, and outputting the blending image to an external display.

* * * * *